United States Patent
Jiang et al.

(10) Patent No.: US 10,965,371 B2
(45) Date of Patent: Mar. 30, 2021

(54) OPTICAL PERFORMANCE MONITORING BASED ON FAST BIT ERROR RATE (BER) STATISTICS

(71) Applicant: HUAWEI TECHNOLOGIES CO., LTD., Guangdong (CN)

(72) Inventors: Zhiping Jiang, Kanata (CA); Ali Salehiomran, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/829,744

(22) Filed: Mar. 25, 2020

(65) Prior Publication Data

US 2020/0328807 A1 Oct. 15, 2020

Related U.S. Application Data

(60) Provisional application No. 62/833,232, filed on Apr. 12, 2019.

(51) Int. Cl.
*H04B 10/079* (2013.01)
*H04B 10/40* (2013.01)
(Continued)

(52) U.S. Cl.
CPC ......... *H04B 10/07953* (2013.01); *G06N 3/04* (2013.01); *H04B 10/25* (2013.01);
(Continued)

(58) Field of Classification Search
CPC .. H04B 10/07953; H04B 10/25; H04B 10/40; H04B 10/58; H04B 10/61; G06N 3/04
See application file for complete search history.

(56) References Cited

U.S. PATENT DOCUMENTS 6,583,903 B1 * 6/2003 Way .................. H04B 10/2569
398/152
7,233,962 B2 * 6/2007 Summerfield ......... H04B 10/07
708/2

(Continued)

FOREIGN PATENT DOCUMENTS

CN 103067120 A 4/2013
CN 107566120 A 1/2018

OTHER PUBLICATIONS

International Search Report and Written Opinion issued in co-pending International application No. PCT/CN2020/084501 dated Jun. 29, 2020.

*Primary Examiner* — Mina M Shalaby
(74) *Attorney, Agent, or Firm* — BCF LLP

(57) ABSTRACT

A method, transceiver, and system for monitoring performance of a fiber optic-based communication network and, in particular to determining contributing linear and nonlinear noise components, is disclosed. The method includes computing fast bit error rate of a received optical signal at a sampling time interval that is less than or equal to 100 microseconds (μsecs), generating, over a time period, a bit error rate distribution data associated with the computed fast bit error rate, applying statistical measurements to the bit error rate distribution data to extract statistical attribute data of the bit error rate distribution data, processing the extracted statistical attribute data to separately determine nonlinear noise components and linear noise components that contribute to total noise levels, and changing a launch power associated with an optical signal to be transmitted in accordance with separately determined nonlinear noise components and linear noise components.

18 Claims, 10 Drawing Sheets

(51) Int. Cl.
*G06N 3/04* (2006.01)
*H04B 10/58* (2013.01)
*H04B 10/61* (2013.01)
*H04B 10/25* (2013.01)

(52) U.S. Cl.
CPC ............ *H04B 10/40* (2013.01); *H04B 10/58* (2013.01); *H04B 10/61* (2013.01)

(56) References Cited

U.S. PATENT DOCUMENTS

| | | | | |
|---|---|---|---|---|
| 10,826,606 | B1* | 11/2020 | Lundberg | H04B 10/70 |
| 2002/0149812 | A1* | 10/2002 | Hong | H04B 10/00 |
| | | | | 398/27 |
| 2009/0196602 | A1* | 8/2009 | Saunders | H04B 10/5053 |
| | | | | 398/26 |
| 2010/0092168 | A1* | 4/2010 | Li | H04B 10/65 |
| | | | | 398/16 |
| 2010/0189445 | A1* | 7/2010 | Nakashima | H04B 10/65 |
| | | | | 398/152 |
| 2012/0141140 | A1* | 6/2012 | Neilson | H04B 10/2587 |
| | | | | 398/171 |
| 2013/0071109 | A1* | 3/2013 | Khatana | H04B 10/615 |
| | | | | 398/38 |
| 2013/0170829 | A1* | 7/2013 | Khatana | H04B 10/6165 |
| | | | | 398/27 |
| 2013/0236171 | A1* | 9/2013 | Saunders | H04B 10/07953 |
| | | | | 398/26 |
| 2013/0336649 | A1* | 12/2013 | Essiambre | H04L 27/06 |
| | | | | 398/27 |
| 2016/0020857 | A1* | 1/2016 | Jia | H04B 10/61 |
| | | | | 398/208 |
| 2016/0127049 | A1* | 5/2016 | Randel | H04B 10/5165 |
| | | | | 398/76 |
| 2019/0013864 | A1* | 1/2019 | Sadot | H03M 13/3723 |

* cited by examiner

| Feature | Formula |
|---|---|
| Mean ($\mu$) | $\mu = E\{x\}$ |
| Mode ($mo$) | The most frequent value |
| Median ($m$) | $\int_{-\infty}^{m} pdf_X(x)\, dx = 0.5$ |
| Standard deviation ($\sigma$) | $\sigma = \sqrt{E\{(x-\mu)^2\}}$ |
| Skewness | $E\{(\frac{x-\mu}{\sigma})^3\}$ |
| Pearson's first coefficient | $(\mu - m)/\sigma$ |
| Asymmetry measure | $1^{st}P + 99^{th}P - 2 \times mo$ |

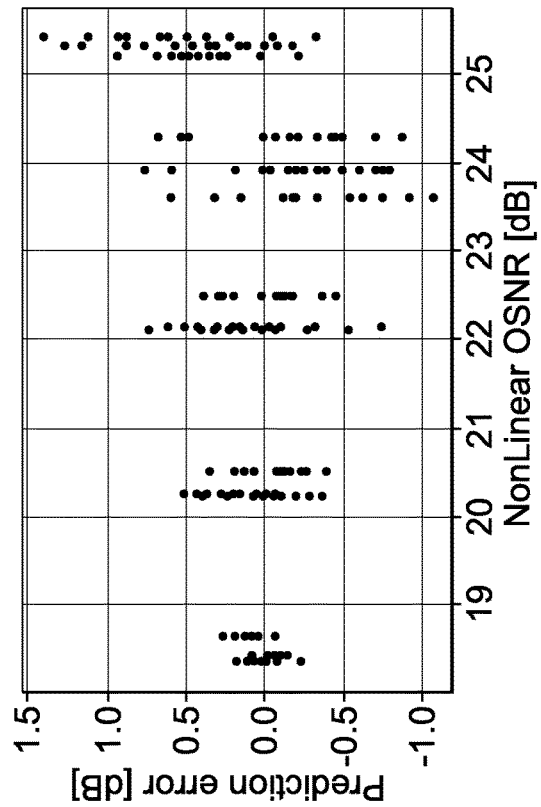
FIG. 7A1
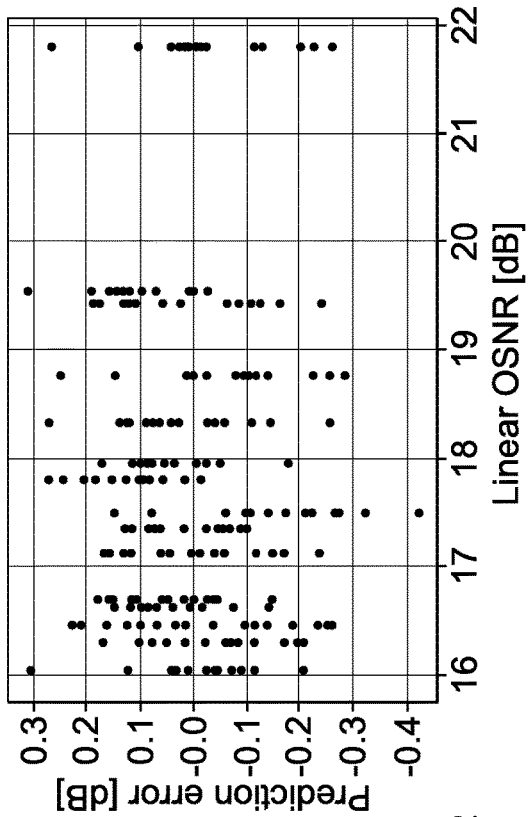
FIG. 7B1
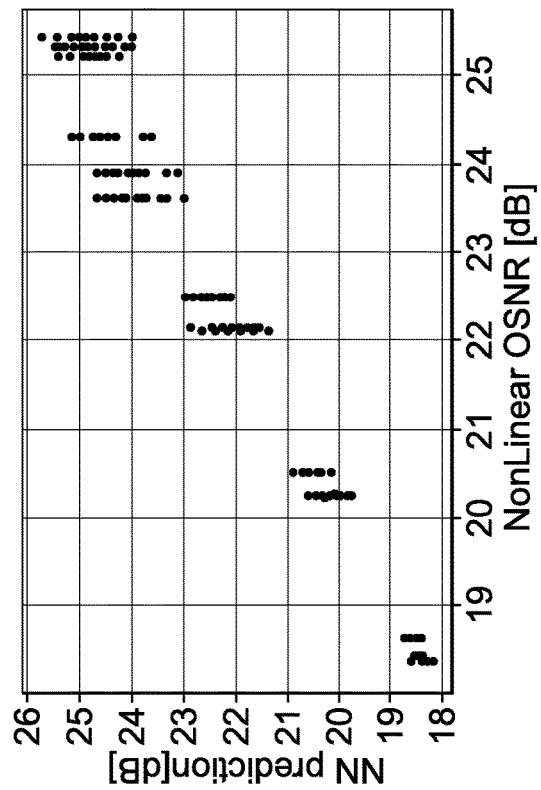
FIG. 7A2
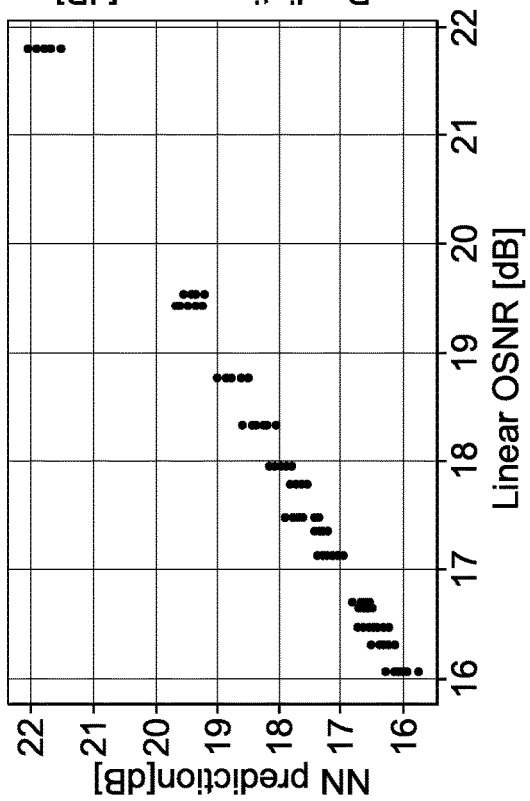
FIG. 7B2

OPTICAL PERFORMANCE MONITORING BASED ON FAST BIT ERROR RATE (BER) STATISTICS

CROSS-REFERENCE TO RELATED APPLICATIONS

This application claims benefit to U.S. Provisional Application No. 62/833,232, entitled "OPTICAL PERFORMANCE MONITORING BASED ON FAST BIT ERROR RATE (BER) STATISTICS", filed on Apr. 12, 2019, the contents of which are incorporated by reference herein in their entirety.

FIELD OF THE INVENTION

The present disclosure generally relates to the field of optical networks and, in particular, to monitoring the performance of fiber optic-based communication networks.

BACKGROUND

In addressing high data-throughput demands, fiber optic-based communications networks, such as, for example, dense wavelength division multiplex (DWDM) networks are configured to combine and simultaneously transmit multiple optical signals operating at different wavelengths along optical fibers at high speeds. Such DWDM networks incorporate a variety of passive and active processing elements to facilitate the conveyance of the multiple information-bearing optical signals. However, some of these elements as well as the physical properties of the optical fiber itself are capable of introducing certain noise contributions that affect the quality of the optical signals propagating through the network.

The quality of the optical signals is generally quantified by an optical signal-to-noise ratio (OSNR), which is a performance-measuring metric that determines the ratio of the received optical signal power to the received noise power after the optical signal propagates through the network. Other generally applied performance-measuring metrics include bit error rate (BER) and symbol error rate (SER). These metrics represent the ratio of the number of detected bit/symbol errors received to the total number of received bits/symbols during a specified time period.

Fiber optic communication systems generally employ OSNR monitoring and BER/SER measurement techniques to determine the aggregate effect of the total noise contributions that affect performance. However, the monitoring of the constituent components of the noise may be advantageous in detecting and analyzing the particular sources of the constituent noise components.

SUMMARY

An object of the present disclosure is to provide a method for monitoring performance of a fiber optic-based communication network and, in particular to determining contributing linear and nonlinear noise components to total noise levels. The method computing fast bit error rate of a received optical signal at a sampling time interval that is less than or equal to 100 microseconds (μsecs), generating, over a time period, a bit error rate distribution data associated with the computed fast bit error rate, applying statistical measurements to the bit error rate distribution data to extract statistical attribute data of the bit error rate distribution data, processing the extracted statistical attribute data to separately determine nonlinear noise components and linear noise components that contribute to total noise levels, and changing a launch power associated with an optical signal to be transmitted in accordance with separately determined nonlinear noise components and linear noise components.

In accordance with this objective, an aspect of the present disclosure provides that the sampling time interval is between 1 nanosecond (nsec) and 100 microseconds (μsecs).

In accordance with this objective, an aspect of the present disclosure provides that the time period is between 10 to 50 minutes.

An additional aspect of the present disclosure provides that the applied statistical measurements to the bit error rate distribution data includes at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

A further aspect of the present disclosure provides that the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

Another object of the present disclosure is to provide an optical coherent detection transceiver comprising a performance monitor, wherein the performance monitor is configured to compute fast bit error rate of a received optical signal at a sampling time interval that is less than or equal to 100 microseconds (μsecs), generate, over a time period, a bit error rate distribution data associated with the computed fast bit error rate, apply statistical measurements to the bit error rate distribution data to extract statistical attribute data of the bit error rate distribution data, process the extracted statistical attribute data to separately determine nonlinear noise components and linear noise components that contribute to total noise levels, and the transceiver is configured to change a launch power associated with an optical signal to be transmitted in accordance with separately determined nonlinear noise components and linear noise components.

In accordance with other aspects of the present disclosure, the optical coherent detection transceiver wherein the sampling time interval is between 1 nanosecond (nsec) and 100 microseconds (μsecs).

In accordance with other aspects of the present disclosure, the optical coherent detection transceiver wherein the time period is between 10 to 50 minutes.

In accordance with other aspects of the present disclosure, the optical coherent detection transceiver wherein the applied statistical measurements to the bit error rate distribution data include at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

In accordance with other aspects of the present disclosure, the optical coherent detection transceiver wherein the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

In accordance with other aspects of the present disclosure, the optical coherent detection transceiver wherein the processing of the extracted statistical attribute data is executed by a multilayer perceptron (MLP) ANN technique that operates to model nonlinear relationships between the statistical attribute data and predict noise-to-signal ratios (NSRs) of the nonlinear noise components and linear noise components.

Another object of the present disclosure is to provide a fiber optic communication network comprising at least one optical coherent detection transceiver wherein, the at least one optical coherent detection transceiver is configured to transmit and receive an optical signal over the fiber optic communication network, the at least one optical coherent detection transceiver comprising a performance monitor, wherein the performance monitor is configured to compute fast bit error rate of a received optical signal at a sampling time interval that is less than or equal to 100 microseconds (μsecs), generate, over a time period, a bit error rate distribution data associated with the computed fast bit error rate, apply statistical measurements to the bit error rate distribution data to extract statistical attribute data of the bit error rate distribution data, process the extracted statistical attribute data to separately determine nonlinear noise components and linear noise components that contribute to total noise levels, and the at least one optical coherent detection transceiver is configured to change a launch power associated with an optical signal to be transmitted in accordance with separately determined nonlinear noise components and linear noise components.

In accordance with other aspects of the present disclosure, the fiber optic communication network wherein the sampling time interval is between 1 nanosecond (nsec) and 100 microseconds (μsecs).

In accordance with other aspects of the present disclosure, the fiber optic communication network wherein the time period is between 10 to 50 minutes.

In accordance with other aspects of the present disclosure, the fiber optic communication network wherein the applied statistical measurements to the bit error rate distribution data include at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

In accordance with other aspects of the present disclosure, the fiber optic communication network wherein the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

In accordance with other aspects of the present disclosure, the fiber optic communication network wherein the processing of the extracted statistical attribute data is executed by a multilayer perceptron (MLP) ANN technique that operates to model nonlinear relationships between the statistical attribute data and predict noise-to-signal ratios (NSRs) of the nonlinear noise components and linear noise components.

BRIEF DESCRIPTION OF THE FIGURES

The features and advantages of the present disclosure will become apparent from the following detailed description, taken in combination with the appended drawings, in which:

FIGS. 4A1-4C3 depict FAST bit error rate (BER) distribution data histograms for certain fiber-optic communication scenarios, in accordance with various embodiments of the present disclosure;

FIGS. 7A1-7B2 graphically depict the errors between the ANN predicted linear and nonlinear noise contributions and the actual measured linear and nonlinear noise contributions;

Figure 1:
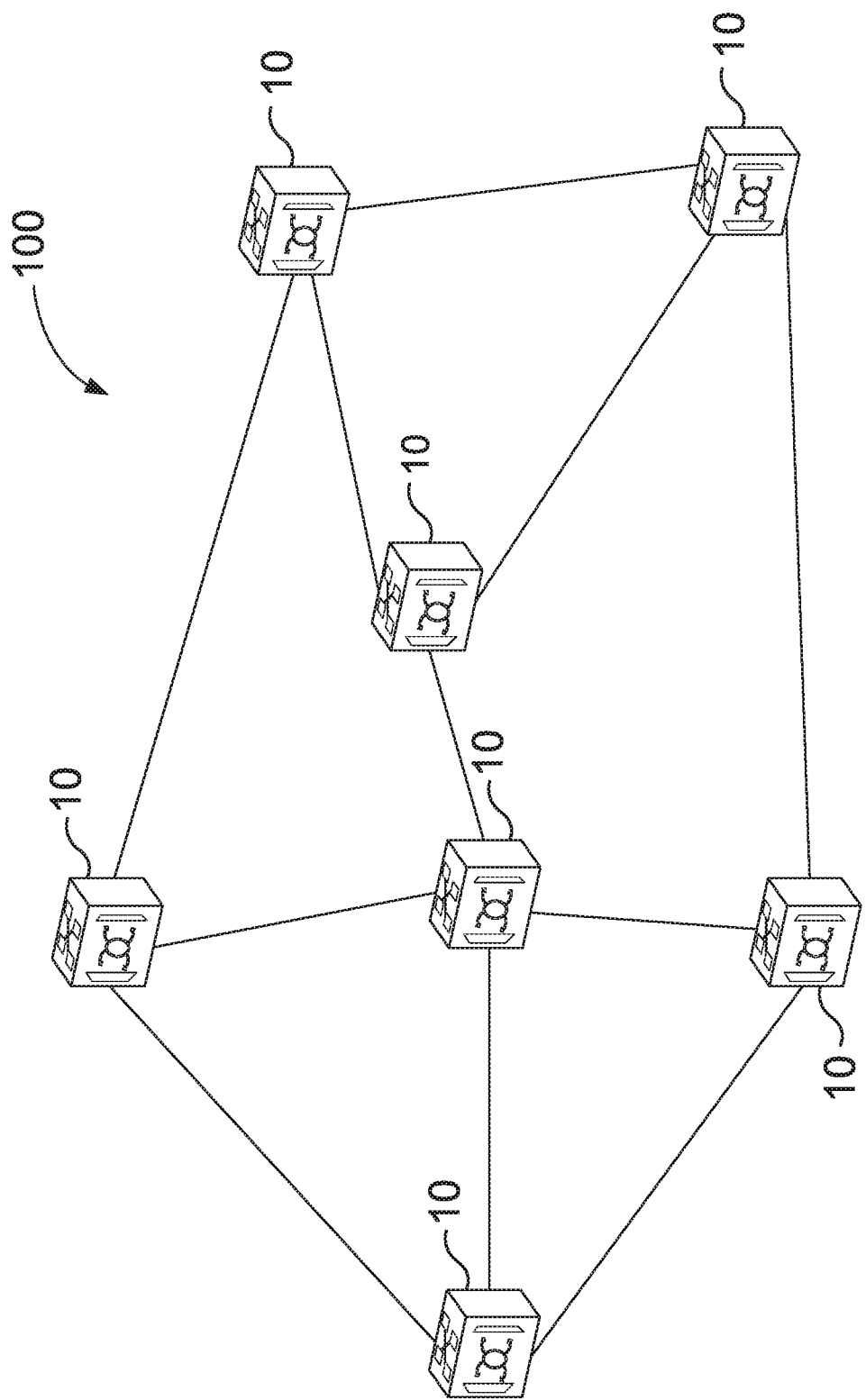
FIG. 1 (Prior Art) depicts a block diagram of an optical network.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain to.

The instant disclosure is directed to a method and a system for monitoring performance of fiber optic-based communication networks. In particular, to processes detecting and analyzing particular sources of noise components to improve performance of the fiber optic-based network.

Referring now to the drawings, FIG. 1 depicts a block diagram of a conventional fiber optic-based communication network 100. As shown, fiber optic network 100 typically includes a plurality of nodes. Each node may include an optical add-drop multiplexer, such as, for example, a reconfigurable optical add-drop multiplexer (ROADM) 10 containing at least one wavelength selective switch (WSS).

The optical network 100 may incorporate one or more laser light sources as well as multiple optical amplifiers, e.g. erbium-doped fiber amplifiers (EDFAs), for amplifying the optical signals. The optical network 100 may further employ one or more optical network elements and modules (which may include either or both of active and passive elements/modules), such as, for example, optical filters, WSSs, arrayed waveguide gratings, and other suitable components. However, for purposes of simplicity and tractability, these elements have been omitted from FIG. 1.

Figure 2:
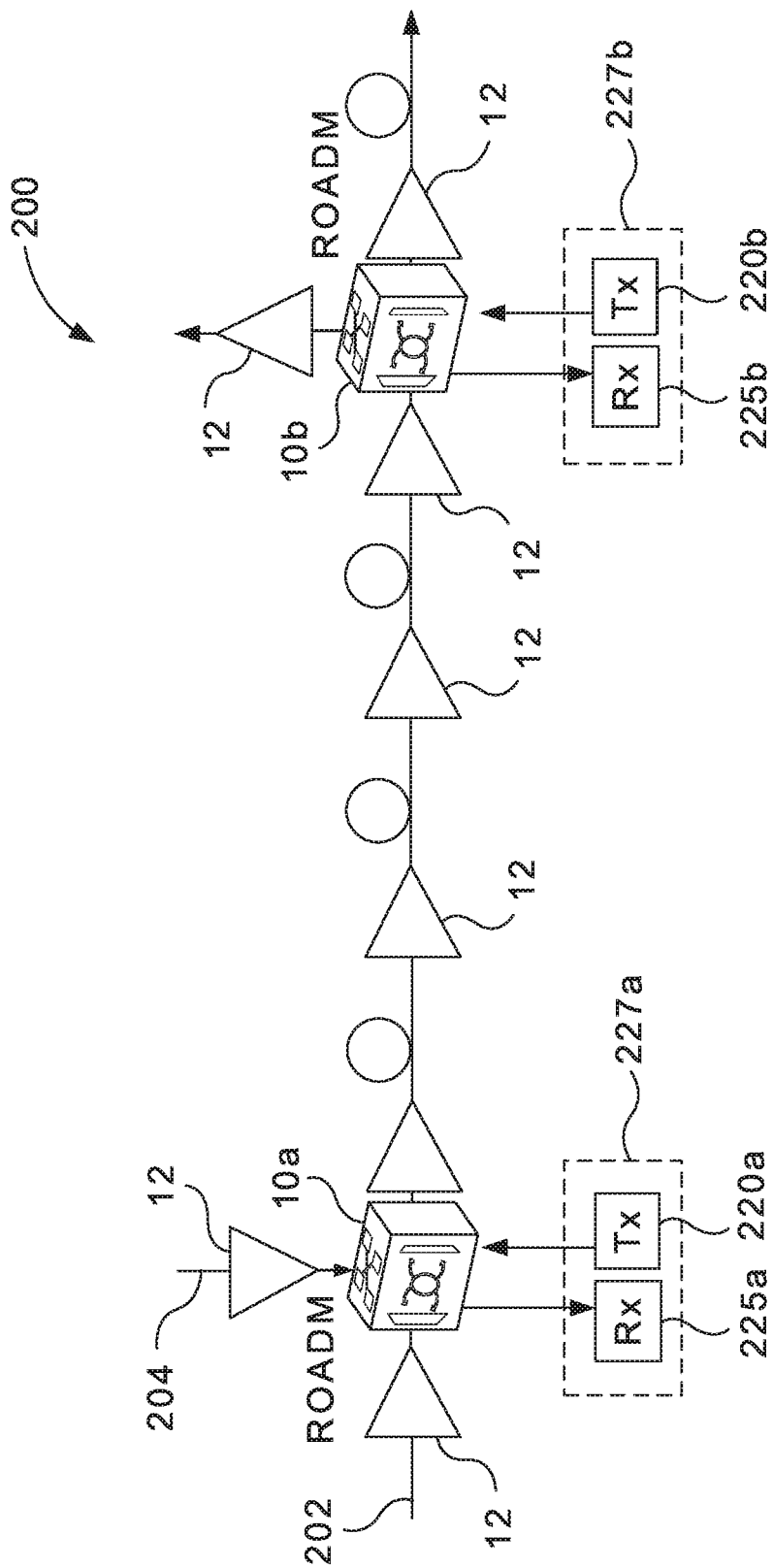
FIG. 2 depicts a block diagram of a link between two reconfigurable optical add-drop multiplexers (ROADMs)

FIG. 2 depicts more detailed view of a link portion 200 between two ROADMs 10a, 10b of a high-speed dense wavelength division multiplexed (DWDM) fiber optic communication network. ROADMs 10a, 10b are respectively communicatively coupled to optical coherent detection transceivers 227a, 227b which, in turn, may each respectively include transmitter Tx 220a and receiver Rx 225a, 220b and Tx 220b and receiver Rx 225b. ROADMs 10a, 10b are configured to transmit, receive, and process one or more DWDM signals 202, 204.

The link 200 also includes a plurality of optical amplifiers 12, such as, for example, EDFAs. The optical amplifiers 12 may be interconnected by optical fiber segments comprising, for example, standard single mode fibers (SSMFs) for moderate span distances or large effective area fibers (LEAFs) for longer span distances.

The quality of the optical signals propagating through a link portion 200 is commonly quantified by an OSNR value metric. OSNR may be expressed as a ratio of the received optical signal power to the received noise power within a given bandwidth:

$$OSNR(\text{dB}) = 10\,lg\left(\frac{P_i}{N_i}\right) + 10\,lg\left(\frac{B_m}{B_r}\right), \quad (1)$$

where $P_i$ is the optical signal power in the i-th optical channel, $B_m$ is the equivalent noise bandwidth, $N_i$ is the noise power introduced within $B_m$, and $B_r$ is the reference optical bandwidth.

Another commonly applied performance-measuring metric of optical signals propagating through link portion 200 is the measurement of at least one of bit error rate (BER) and symbol error rate (SER), which indicates the ratio of the number of detected bit/symbol errors received to the total number of received bits/symbols during a specific time period. For a given modulation constellation, there is a scaling factor relationship between SER and BER (e.g., a constellation shaping 16 QAM, the SER is approximately 3.7 times the BER). The BER/SER is typically averaged over a 1 sec sampling time interval, which is often extended 5, 10, 15 min, etc. to report average BER/SER, minimum BER/SER, and maximum BER/SER for the respective sampling time intervals.

Regarding optical signal performance, as noted above, fiber optic network processing elements along with the properties of the optical fiber itself are capable of introducing certain noise contributions that affect the quality of the optical signals propagating through the network. In particular, optical amplifiers may significantly introduce noise to the optical channel signal. Such noise is related to amplifier spontaneous emissions (ASE) and contributes to the total optical link noise that affects the OSNR and BER/SER metrics of an optical link.

Another significant contributing factor to the total optical link noise amount is fiber nonlinear (FNL) noise. FNL noise stems from fiber nonlinearities experienced by coherent fiber optical communication systems, such as, self-phase modulation (SPM) and cross-phase modulation (XPM). SPM induces a nonlinear effect caused by the attributes of the signal channel itself while XPM induces a nonlinear effect caused by neighboring signal channels. The FNL noise caused by SPM/XPM behaves, and is often mischaracterized, as ASE noise, thereby further impacting the OSNR of an optical link.

As noted above, in efforts to measure and manage the quality of propagating optical signals, fiber optic communication systems employ monitoring techniques that determine OSNR and BER/SER performance metric values based on the total optical link noise. In order words, conventional OSNR and BER/SER monitoring techniques operate to quantify the aggregate effect of the constituent ASE and FNL noise components that contribute to the total optical link noise. However, such conventional techniques do not monitor, measure, or differentiate between the respective influences of ASE noise and FNL noise components to OSNR and BER/SER performance metrics.

It should be appreciated that the ability to detect, quantify and separate the effects of FNL noise from the ASE noise contributions, offers considerable benefits in determining operational and configuration measures that improve the performance of the fiber optic networks and associated operating elements. For example, quantifying the effects of FNL noise would provide useful information in determining channel power optimization, fault localization, optimal system parameter configurations, etc.

As discussed above, typical BER/SER measurements computed by conventional optical coherent detection transceivers are averaged over a time window ≥1 sec to produce performance statistics representative of the total link noise. However, these BER/SER statistics do not provide any useful information regarding FNL noise behavior to distinguish FNL noise effects from ASE noise effects on the OSNR.

With this said, the various embodiments of the instant disclosure are directed to a method and a system for monitoring the performance of fiber optic-based communication networks that distinguishes the contributions of FNL noise from ASE noise to the total link noise.

Figure 3:
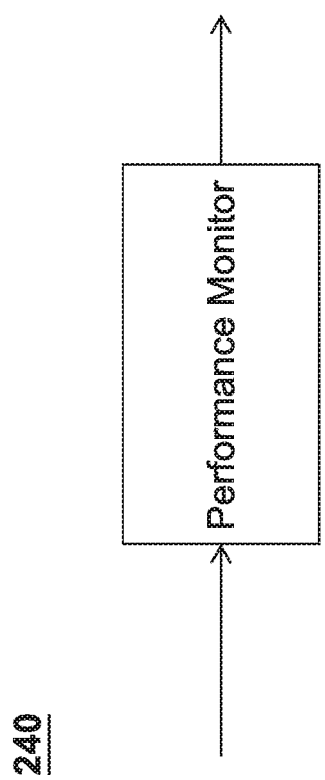
FIG. 3 illustrates a high-level functional block diagram of a performance monitor employed in each of the optical coherent detection transceivers, in accordance with various embodiments of present disclosure.
Figure 4:
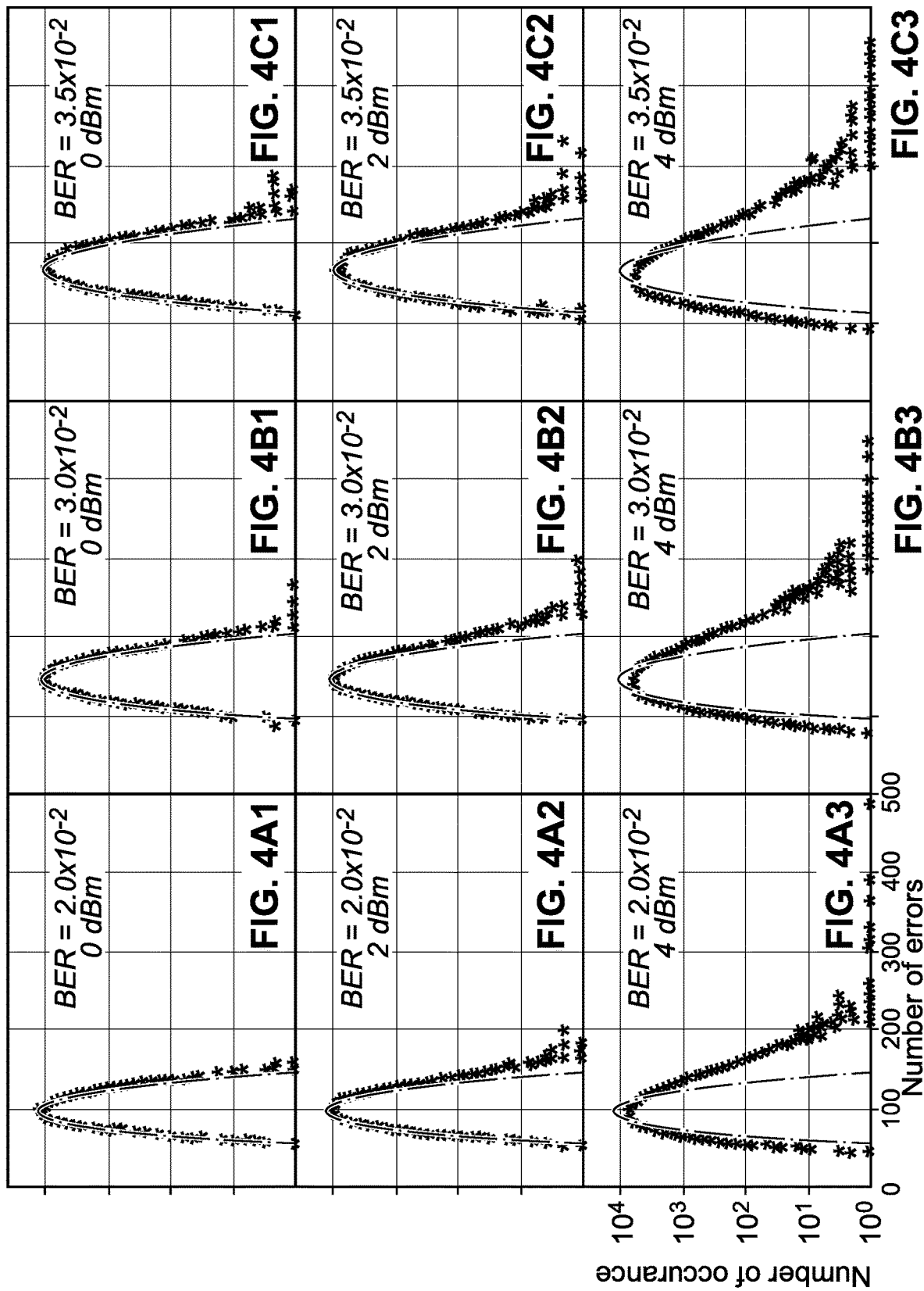

FIG. 3 illustrates a high-level functional block diagram of a performance monitor 240 employed in each of the optical coherent detection transceivers 227a and 227b, in accordance with various embodiments of present disclosure. In certain embodiments, the optical coherent detection transceivers 227b may be configured to receive optical signals transmitted by the optical coherent detection transceivers 227a. The optical coherent detection transceivers 227b may provide the received optical signals to the performance monitor 240 for further processing in order to measure and manage the quality of the received optical signals. As such, the performance monitor 240 may be configured to compute a FAST BER of a received optical signal at a sampling time interval that is less than or equal to 100 microseconds (μsecs). In certain embodiments, the sampling time interval may be in between 1 nanosecond (nsec) and 100 microseconds (μsecs).

In certain embodiments, the performance monitor 240 may be configured to observe the computed FAST BERs over a certain time period. By way of a non-limiting example, the performance monitor 240 may compute the FAST BER of the received optical signal at a sampling interval of 1 μsec, the performance monitor 240 may observe the FAST BER for the next 15 minutes. It is to be appreciated that the time period during which the performance monitor observes the FAST BER may varies from 10 to 50 minutes. Over the time period during which the FAST BER is being observed, the performance monitor 240 may generate a higher-resolution distribution data and associated distribution curve histograms representative of the FAST BER. It has been observed experimentally that by substantially reducing the sampling time interval associated with the computation of BER to nsecs or µsecs, such accelerated BER/SER computation (herein referred to collectively as "FAST BER") generate more detailed statistics and higher-resolution distributions containing useful information indicative of ASE and FNL noise contributions. By way of example, a 50 nsec sampling time interval will yield 20 million BER/SER measurements in 1 sec, providing a statistically robust, higher-resolution BER/SER distribution curve.

FIGS. 4A1-4C3 illustrate the BER distribution histograms generated by FAST BER computations for three identically-configured fiber-optic communication experimental scenarios, in accordance with the various embodiments of the present disclosure. Specifically, the fiber-optic communication scenario configuration incorporates a fiber-optic link containing 15 fiber-optic segments with each segment comprises a single mode fiber (SMF) spanning a distance of 80 km; a signal format comprising a 16 QAM constellation; and a fully loaded system occupying 80 channels in the C-band with a test signal operating at channel 40. Moreover, the FAST BER computations comprise a sampling time interval of 37.6 nsec servicing 1280 transmitted symbols operating at 34 GBaud/sec to render 327,680 BER measurements. It is to be noted that in real-time applications, the total measurement time period may be easily to seconds or minutes, such that the number of measurements may reach an order of magnitude larger to provide an even more detailed FAST BER distribution curve.

In particular, FIGS. 4A1-4A3, FIGS. 4B1-4B3, and FIGS. 4C1-4C3 respectively depict the FAST BER distribution histogram for target average BERs of $2 \times 10^{-2}$, $3 \times 10^{-2}$, and $3.5 \times 10^{-2}$ as a function of optical signal launch power levels introduced into fiber-optic communication scenario configuration of 0.0 dBm, 2.0 dBm, and 4.0 dBm.

As shown, for the case of an optical signal launch power level of 0.0 dBm, FIGS. 4A1, 4B1, 4C1, respectively indicate that for each of the targeted average BERs of $2 \times 10^{-2}$, $3 \times 10^{-2}$, and $3.5 \times 10^{-2}$ of the fiber-optic communication scenario configuration, the FAST BER computations provide a distribution substantially conforms to the theoretical, Poisson probability distribution model (indicated by a solid line). These results evidence that at relatively low optical signal power levels, the FNL noise is relatively small, it does not significantly affect the FAST BER distribution. Therefore, at the 0.0 dBm power level, any minor deviations from the Poisson distribution model are directly attributable to ASE noise contributions with small contribution from the FNL noise.

In contrast, FIGS. 4A2, 4B2, 4C2 and FIGS. 4A3, 4B3, 4C3, respectively illustrate the FAST BER distribution histograms, as the optical signal launch power level is increased to 2.0 dBm and 4.0 dBm. The depicted FAST BER distributions demonstrate that, for each of the targeted BERs (e.g., $2 \times 10^{-2}$, $3 \times 10^{-2}$, and $3.5 \times 10^{-2}$), as the optical signal launch power is increased, significant asymmetrical, skewed deviations from the Poisson model are produced. To be specific, the FAST BER distributions exhibit a substantially skewed, dense tail portion. These results evidence that, at appreciable optical signal launch power levels, the nonlinear properties of the optical fiber are affected by the optical signal power levels, which operate to induce FNL noise contributions. And, at time interval windows of nsecslpsecs, these FNL noise contributions emerge as skewed, dense distribution tail portions.

Thus, in accordance with the various embodiments of the present disclosure, the characteristics of the FAST BER distributions may be exploited to provide information regarding the ASE and FNL noise contributions for fiber-optic networks. For example, the illustrated distributions indicate that for the same target BER, the total link noise is the same, thus what varies is the ratio of ASE to FNL noise contributions, as the optical launch power increases. Moreover, the illustrated distributions also indicate that for the same launch power, the FNL noise contributions are the same, but the ASE noise contributions vary. Further, the illustrated distributions also indicated that there are significant differences in the error count distribution, particularly for the right distribution tail, as the optical launch power increases. Each of these indicated distribution characteristics may be analyzed and processed to extract information that individually quantifies the ASE and FNL noise contributions.

Specifically, one or more statistical measures may be applied to the distribution characteristics to extract data indicative of noise contributions, in accordance with various embodiments of the present disclosures. In certain embodiments, the performance monitor 240 may be configured to apply various statistical and computational operations to the FAST BER distribution data in order to extract statistical attribute data of the FAST BER distribution data.

Figure 5:
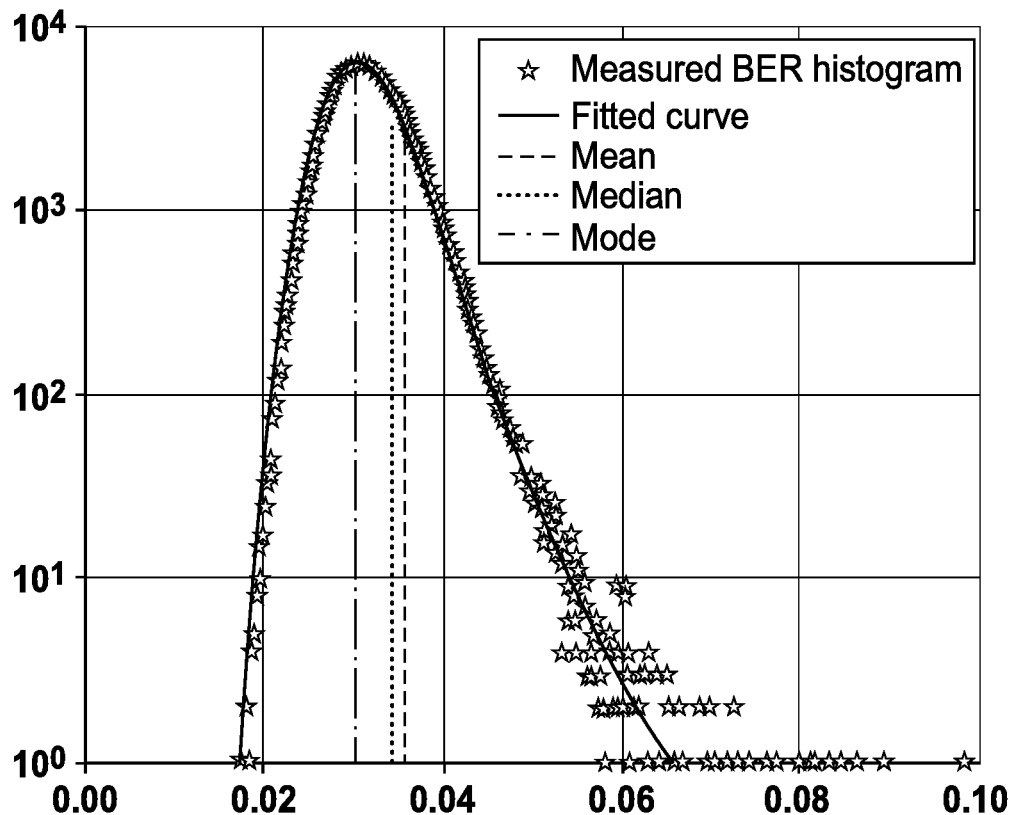
FIG. 5 depicts an exemplary FAST BER distribution data histogram for a fiber-optic communication scenario, in accordance with various embodiments of the instant disclosure.

In particular, FIG. 5 illustrates a representative FAST BER distribution histogram, in accordance with various embodiments of the instant disclosure. For purposes of simplicity, the illustrated distribution histogram depicts the FAST BER computed distribution data (indicated by star plots) along with superimposed reference lines indicating various statistical metrics that may be applied to the distribution data, such as, for example, a fitted distribution curve envelope, a mean, median, and mode of the distribution data. Moreover, as listed in FIG. 5, other statistical metrics may be additionally applied, such as, for example, standard deviation, skewness, Pearson's coefficient, asymmetry, deviation from Poisson model, tail slope, etc. It will be appreciated that, in accordance with the disclosed embodiments, the indicated statistical measurements applied to the BER distribution are not intended to be limiting in any way.

The measured statistical data extracted from the FAST BER distribution may then be processed, by the performance monitor 240, to determine and quantify the ASE and FNL noise contributions. In accordance with the disclosed embodiments, such processing may include Artificial Neural Network (ANN) techniques, linear/nonlinear regression analysis techniques, support vector regression techniques, random forest techniques, nonlinear curve fitting techniques, empirical formula estimation techniques, etc. It will also be appreciated that, in accordance with the disclosed embodiments, the indicated processing techniques applied to the measured statistical data are not intended to be limiting in any way.

Figure 6:
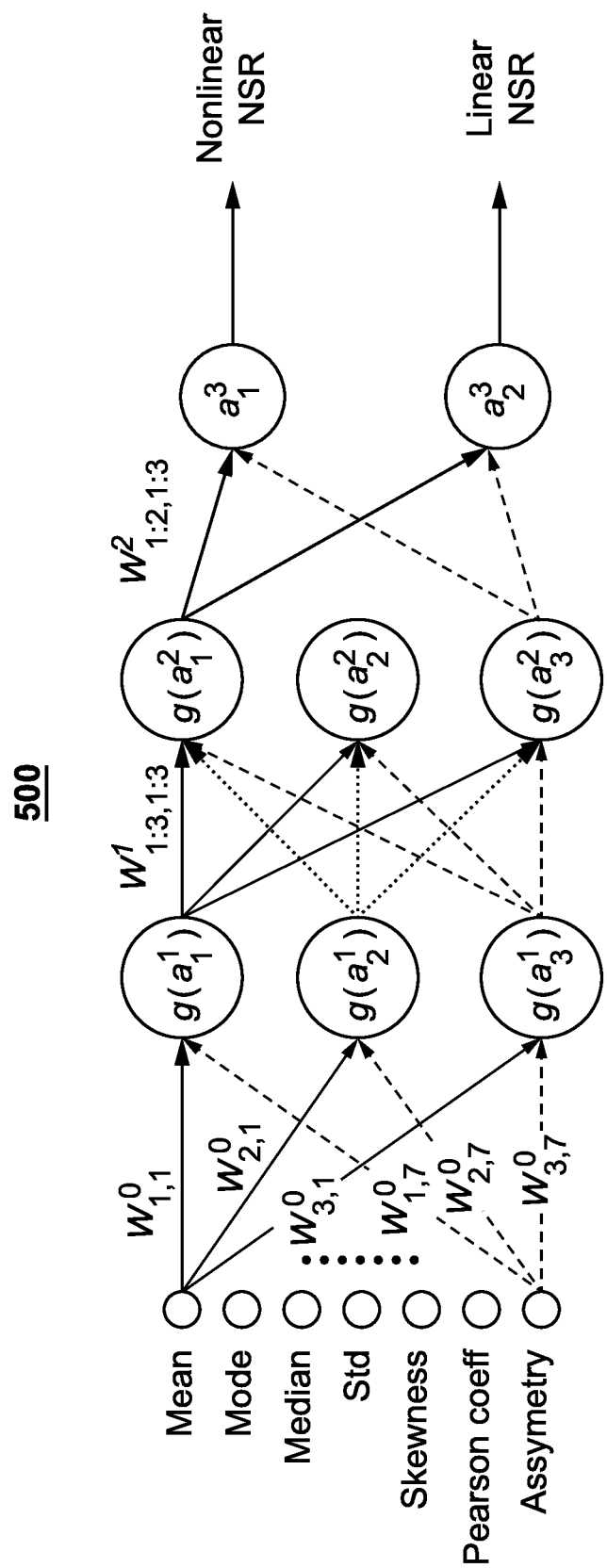
FIG. 6 depicts a representative ANN processing technique that predicts the linear and nonlinear noise contributions, in accordance with various embodiments of the instant disclosure.

FIG. 6 illustrates a representative ANN processing technique 500 that determines and quantifies the individual ASE and FNL noise contributions based on the measured statistical data extracted from the BER distribution data, in accordance with an embodiment of the instant disclosure. In the depicted embodiment, processing technique 500 is architected as a multilayer perceptron (MLP) ANN that operates to model the nonlinear relationship between the measured statistical data extracted from the BER distribution data and the estimated/predicted noise-to-signal ratios (NSRs) (i.e., inverse of OSNR).

The general MLP ANN architecture consists of at least three layers containing operational nodes: an input layer, one or more hidden layers, and an output layer. The hidden layers are configured to learn nonlinear relationships characteristics between input data (e.g., in this case, measured BER statistical data) and output information (e.g., in this case, estimated/predicted NSRs). As such, the nodes of the hidden layers are characterized as artificial neurons that execute a nonlinear activation function, such as, for example, Gaussian function, logistical functions, hyperbolic functions, etc. that execute computations based on the received node data, predefined weighting factors, and biasing values. The artificial neurons of one hidden layer communicate the computed values to neurons of subsequent hidden layers executing similar computations, until the final estimated values (e.g., in this case, predicted NSRs) are forwarded to the output layer nodes.

In the illustrated embodiment, MLP ANN 500 is configured with two hidden layers (e.g., $g(a^1_i)$, $g(a^2_i)$) each comprising three nodes (e.g., i=1, 2, 3) and an output layer comprising two nodes (e.g., $a^3_1$, $a^3_2$). As shown, the MLP ANN 500 inputs are supplied with the measured statistical data indicative of the mean and asymmetry of the BER distribution data. MLP ANN 500 operates to process the input measured statistical data by applying the nonlinear activation functions and associated weighting factors throughout the hidden layers. To train MLP ANN, each of the fiber-optic communication simulation trial scenario conditions noted above were processed 20 times and the Fast BER was used to extract information representing the predicted NSR attributable to nonlinear FNL noise and the predicted NSR attributable to linear ASE noise.

FIG. 7A1 graphically depicts the MLP ANN 500 predicted values for nonlinear FNL noise contributions as a function of actual measured nonlinear OSNR while FIG. 7A2 graphically quantifies the error between the ANN 500 predicted nonlinear FNL noise contribution values versus the actual measured nonlinear FNL noise contribution values. As such, the noise contribution while measuring nonlinear OSNR is FNL noise. Similarly, FIG. 7B1 graphically depicts the MLP ANN 500 predicted values for linear ASE noise contributions as a function of actual measured linear OSNR while FIG. 7B2 graphically quantifies the error between the ANN 500 predicted linear ASE noise contribution values versus the actual measured linear ASE noise contribution values. As such, the noise contribution while measuring linear OSNR is ASE noise.

The quantified prediction error graph of FIG. 7A2 demonstrates that the error between the ANN 500 predicted nonlinear FNL noise contribution values and the actual measured nonlinear FNL noise contribution values are substantially confined to within an acceptable range of approximately 2.0 dB. In like fashion, the quantified prediction error graph of FIG. 7B2 demonstrates that the error between the ANN 500 predicted linear ASE noise contribution values and the actual measured linear ASE noise contribution values are substantially confined to within an acceptable range of approximately less than 0.5 dB.

In so doing, the quantified prediction error graphs of FIGS. 7A2, 7B2 confirm substantial agreement between the ANN 500 predicted nonlinear FNL and ASE linear noise contribution values and the actual measured nonlinear FNL and linear ASE noise contribution values.

Figures 8A, 8B:
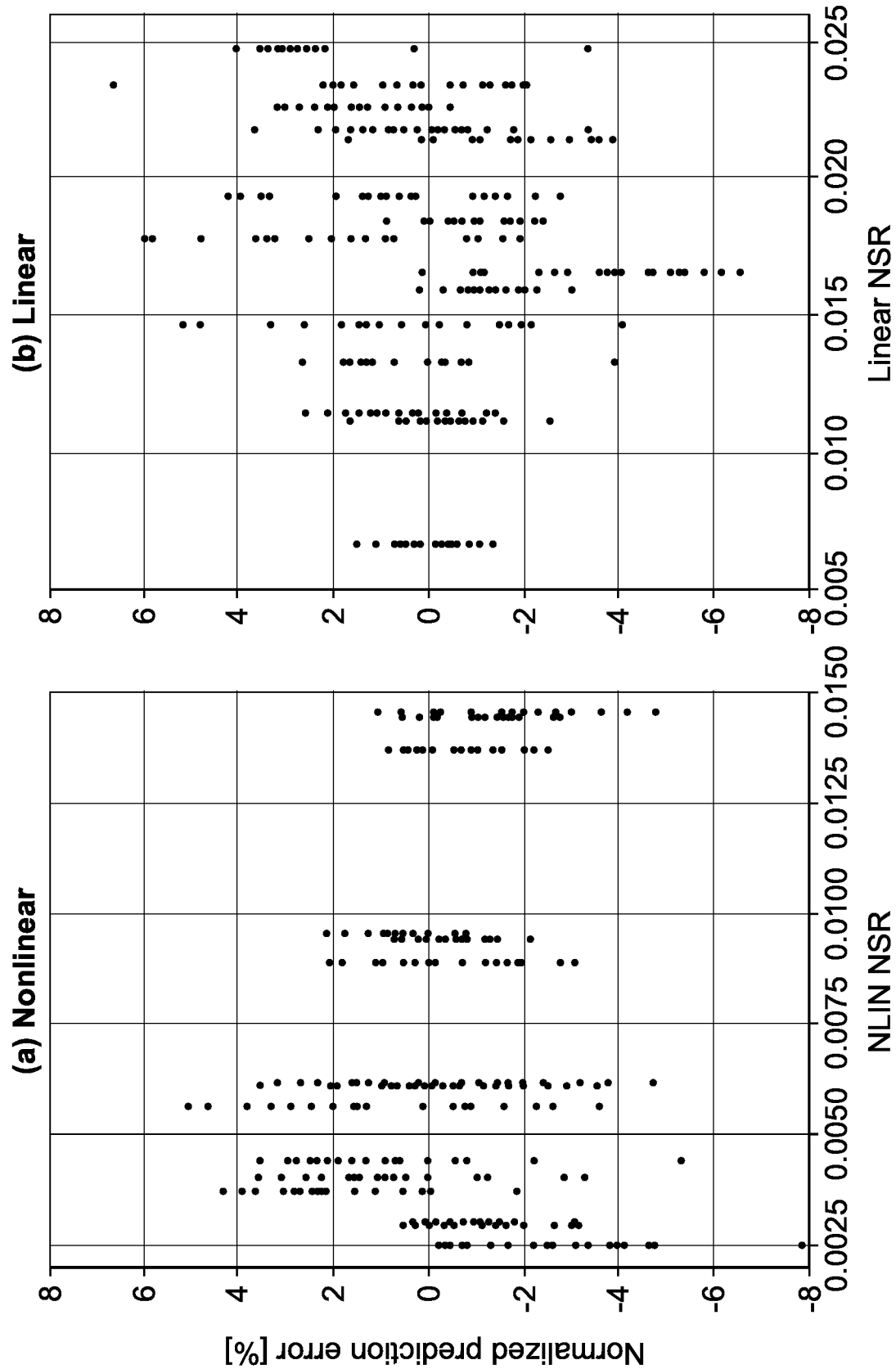
FIGS. 8A, 8B respectively graphically depict the normalized percentage error between the ANN predicted linear and nonlinear noise values and the actual measured linear and nonlinear noise values.

Along similar lines, FIG. 8A graphically depicts the normalized percentage error between the predicted ANN 500 NSR values attributable to nonlinear FNL noise and the actual measured NSR values attributable to the FNL noise. FIG. 8B graphically depicts the normalized percentage error between the predicted ANN 500 NSR values attributable to linear ASE noise and the actual measured NSR values attributable to ASE noise. As indicated by FIGS. 8A, 8B, the normalized percentage error between the predicted ANN 500 NSR values and the actual measured NSR values are within an acceptable tolerance of approximately 8%.

Figure 8C:
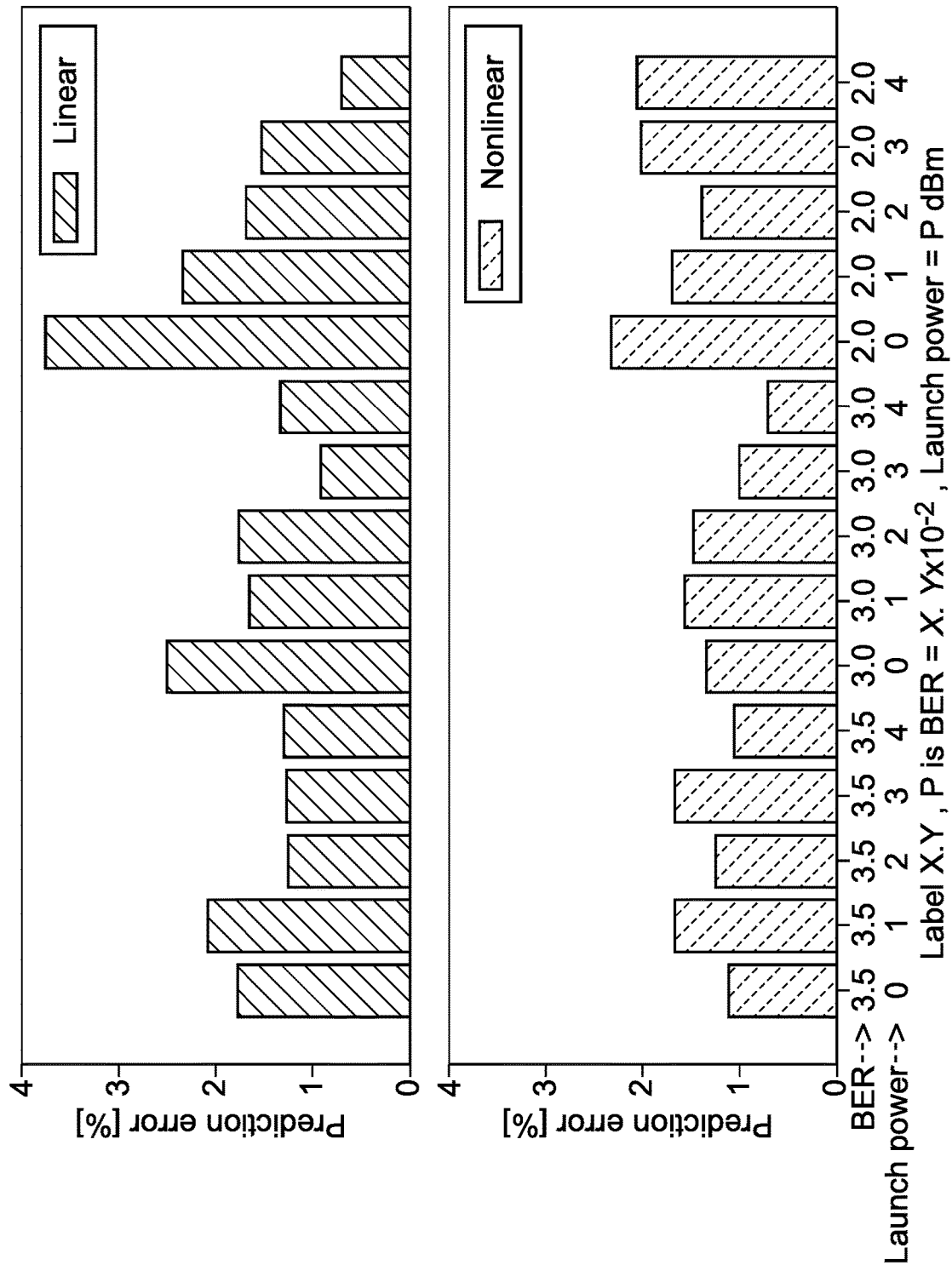
FIG. 8C graphically depicts the absolute percentage error of ANN predicted linear and nonlinear values.

FIG. 8C graphically depicts the mean absolute percentage error of ANN 500 predicted linear and nonlinear values. The mean absolute percentage error quantifies the difference between linear and nonlinear noise values of conventional BER vs. OSNR (BO) distribution curves and the ANN 500 predicted distribution curves that are normalized to the total noise. It will be appreciated that this measure of accuracy is more meaningful than the absolute error, particularly when one of the noise components is substantially smaller than other noise components. As shown, there is substantial agreement between the conventional distribution curves and the ANN 500 distribution curves, as the mean absolute percentage error indicates variances that are less than 4%.

Returning to FIG. 3, the performance monitor 240 may separately determine the influence of the ASE noise and FNL noise components to OSNR and BER/SER performance metrics. As previously discussed, with increase in optical signal launch power into the optical fiber, the ASE noise components decrease but the FNL noise components increases. In certain embodiments, the optical coherent detection transceivers 227a and 227b may change the optical signal launch power in accordance with separately determined ASE noise components and FNL noise components. The change of the optical signal launch power may include but not limited to an increase, a decrease, a reset or the like. Such as, for example, the optical coherent detection transceivers 227a and 227b may reduce the optical signal launch powers if the determined FNL noise components are too high.

In certain non-limiting embodiments of the present disclosure, based on separately determined the influence of the ASE noise and FNL noise components to OSNR and BER/SER performance metrics, the performance monitor 240 may estimate the operating noise margin more efficiently. In so doing, the performance monitor 240 may be further configured to evaluate health of the corresponding optical links, such as robustness of the optical links. In certain embodiments, if the health of some of the optical links is below certain threshold, the performance monitor 240 may be configured to re-route high priority traffic data to another link having higher operating noise margin, uses the links having low operating noise margin to carry low priority traffic data.

Figure 9:
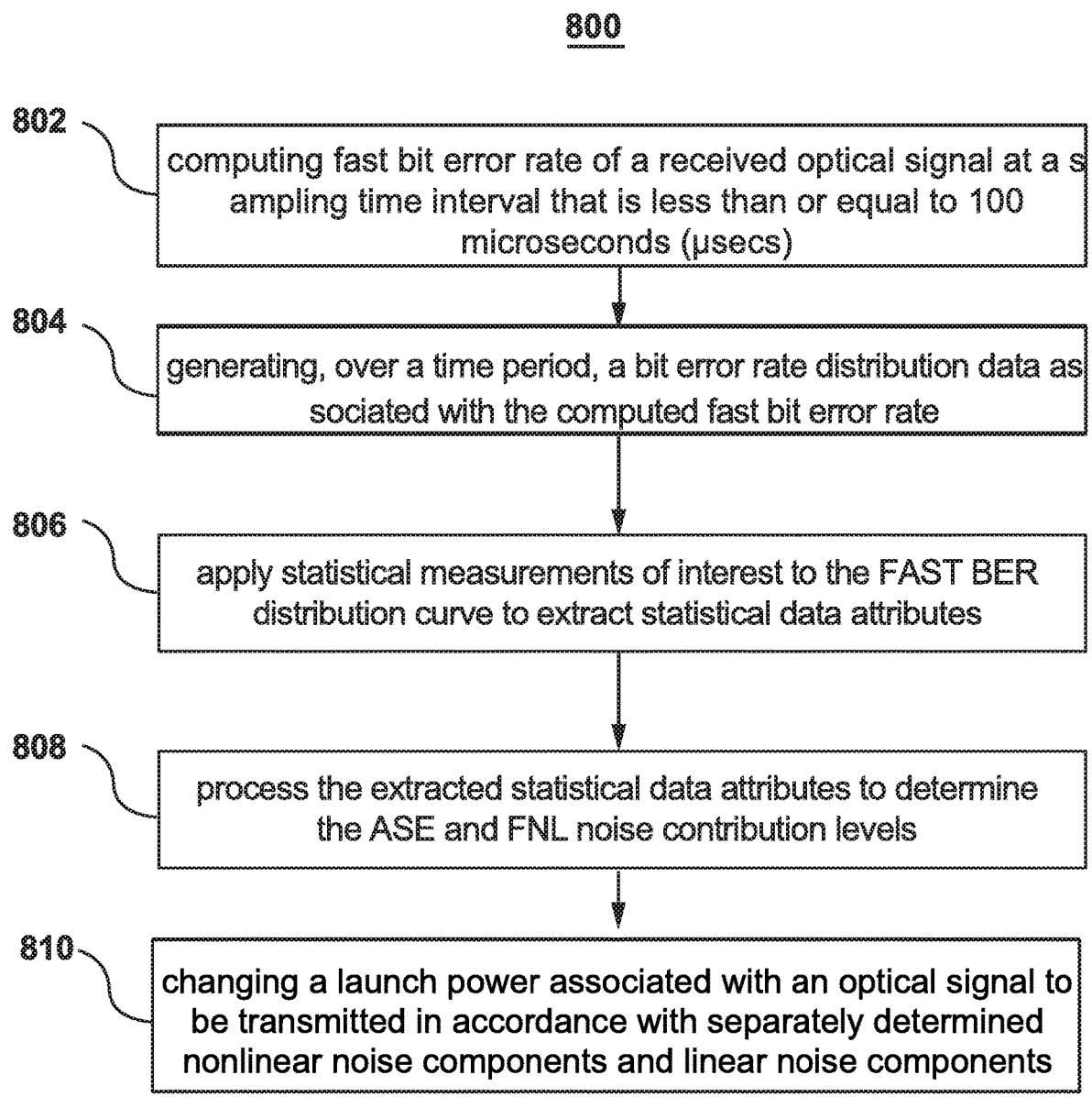
FIG. 9 depicts a functional flowchart directed to a method for monitoring the performance of fiber optic-based communication networks, in accordance with various embodiments of the present disclosure.

FIG. 9 depicts a flowchart illustrating process 800 directed to monitoring the performance of fiber optic-based communication networks, in accordance with various embodiments of the present disclosure. Process 800 commences at task block 802, in which the performance monitor 240 computes FAST BER of a received optical signal at a sampling time interval that is less than or equal to 100 microseconds (μsecs). As noted above, the FAST BER computations are achieved by reducing the sampling time interval to orders of magnitude less than 100 μsecs, and in particular, to the order of nsecs to μsecs, such as from 10, 20, 30 or so nsecs to 10, 20, 30 or so μsecs, such that the FAST BER generates a substantially increased amount of BER measurement data greater than conventional BER measurements to provide more detailed error statistics and higher-resolution distribution data.

At task block 804 of the process 800 the performance monitor 240 operates to generate, over a time period, a bit error rate distribution data associated with the computed fast bit error rate. The detailed distribution curve will evidence certain informational characteristics that may be exploited to reveal ASE and FNL noise contributions. In turn, at task block 806, the performance monitor 240 applies statistical measurements of interest to the distribution curve to extract statistical data attributes. As discussed above and depicted by FIG. 5, given the detailed distribution curve manifesting performance characteristics, various statistical measurements may be applied, such as, for example, the mean, median, mode standard deviation, skewness, Pearson's coefficient, asymmetry, deviation from Poisson model, tail slope, etc. to extract relevant statistical data attributes from the distribution curve.

At task block 808, the performance monitor 240 processes the extracted relevant statistical data attributes of the distribution curve to determine and quantify the ASE and FNL noise contributions to the total link noise. As previously discussed, the processing of the extracted statistical data attributes may include Artificial Neural Network (ANN) techniques, linear/nonlinear regression analysis techniques, support vector regression techniques, random forest techniques, nonlinear curve fitting techniques, empirical formula estimation techniques, etc. These processing techniques may be configured to identify the ASE and FNL noise components contributing to the NSR level.

Finally at task block 810, at least one the optical coherent detection transceivers 227a and 227b changes a launch power associated with an optical signal to be transmitted in accordance with separately determined nonlinear noise components and linear noise components. Such as, for example, the optical coherent detection transceivers 227a and 227b may reduce the optical signal launch powers if the determined FNL noise components are too high.

Hence, in accordance with the disclosed embodiments, the effective monitoring and optimization of fiber optic-based communication network performance may be achieved by applying FAST BER and statistical measurement techniques to separately detect and quantify the contributions of FNL noise from ASE noise. Such separate detection of FNL and ASE noise contributions allows for the opportunity to optimize operational and configurational parameters that improve the performance of the fiber optic networks. Although the launch power associated with an optical signal to be transmitted may be changed in accordance with separately determined FNL noise components and ASE noise components, it will be appreciated that the separately determined FNL noise component and ASE noise component information may be used in various other tangible applications and related specific system requirements.

It is to be understood that the operations and functionality of the disclosed methods may be achieved by at least one of hardware-based, software-based, firmware-based elements. Such operational alternatives do not, in any way, limit the scope of the present disclosure. In particular, the performance monitor 240 and the process 800 may comprise a series of operations implemented by a computer, a processor operatively connected to a memory, or a machine, those operations may be stored as a series of instructions readable by the machine, processor or computer, and may be stored on a non-transitory, tangible medium.

It will also be understood that, although the principles and implementations presented herein have been described with reference to specific features, structures, and embodiments, it is clear that various modifications and combinations may be made without departing from such disclosures. The specification and drawings are, accordingly, to be regarded simply as an illustration of the inventive embodiments and principles as defined by the appended claims, and are contemplated to cover any and all modifications, variations, combinations or equivalents that fall within the scope of the present disclosure.

What is claimed is:

1. An optical coherent detection transceiver comprising:
   a performance monitor, wherein the performance monitor is configured to:
   compute fast bit error rate of a received optical signal at a sampling time interval that is less than or equal to 100 microseconds (μsecs);
   generate, over a time period, a bit error rate distribution data associated with the computed fast bit error rate;
   apply statistical measurements to the bit error rate distribution data to extract statistical attribute data of the bit error rate distribution data;
   process the extracted statistical attribute data to separately determine nonlinear noise components and linear noise components that contribute to total noise levels; and
   the transceiver is configured to change a launch power associated with an optical signal to be transmitted in accordance with separately determined nonlinear noise components and linear noise components.

2. The optical coherent detection transceiver of claim 1, wherein the sampling time interval is between 1 nanosecond (nsec) and 100 microseconds (μsecs).

3. The optical coherent detection transceiver of claim, wherein the time period is between 10 to 50 minutes.

4. The optical coherent detection transceiver of claim 1, wherein the applied statistical measurements to the bit error rate distribution data include at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

5. The optical coherent detection transceiver of claim 1, wherein the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

6. The optical coherent detection transceiver of claim 5, wherein the processing of the extracted statistical attribute data is executed by a multilayer perceptron (MLP) ANN technique that operates to model nonlinear relationships between the statistical attribute data and predict noise-to-signal ratios (NSRs) of the nonlinear noise components and linear noise components.

7. A method for monitoring performance of a fiber optic-based communication network, comprising:
   computing fast bit error rate of a received optical signal at a sampling time interval that is less than or equal to 100 microseconds (μsecs);
   generating, over a time period, a bit error rate distribution data associated with the computed fast bit error rate;

applying statistical measurements to the bit error rate distribution data to extract statistical attribute data of the bit error rate distribution data;

processing the extracted statistical attribute data to separately determine nonlinear noise components and linear noise components that contribute to total noise levels; and changing a launch power associated with an optical signal to be transmitted in accordance with separately determined nonlinear noise components and linear noise components.

8. The method of claim 7, wherein the sampling time interval is between 1 nanosecond (nsec) and 100 microseconds (μsecs).

9. The method of claim 7, wherein the time period is between 10 to 50 minutes.

10. The method of claim 7, wherein the applied statistical measurements to the bit error rate distribution data include at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

11. The method of claim 7, wherein the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

12. The method of claim 11, wherein the processing of the extracted statistical attribute data is executed by a multilayer perceptron (MLP) ANN technique that operates to model nonlinear relationships between the statistical attribute data and predict noise-to-signal ratios (NSRs) of the nonlinear noise components and linear noise components.

13. A fiber optic communication network comprising:
at least one optical coherent detection transceiver wherein,
the at least one optical coherent detection transceiver is configured to transmit and receive an optical signal over the fiber optic communication network;
the at least one optical coherent detection transceiver comprising:
a performance monitor, wherein the performance monitor is configured to:
compute fast bit error rate of a received optical signal at a sampling time interval that is less than or equal to 100 microseconds (μsecs);
generate, over a time period, a bit error rate distribution data associated with the computed fast bit error rate;
apply statistical measurements to the bit error rate distribution data to extract statistical attribute data of the bit error rate distribution data;
process the extracted statistical attribute data to separately determine nonlinear noise components and linear noise components that contribute to total noise levels; and
the at least one optical coherent detection transceiver is configured to change a launch power associated with an optical signal to be transmitted in accordance with separately determined nonlinear noise components and linear noise components.

14. The fiber optic communication network of claim 13, wherein the sampling time interval is between 1 nanosecond (nsec) and 100 microseconds (μsecs).

15. The fiber optic communication network of claim 13, wherein the time period is between 10 to 50 minutes.

16. The fiber optic communication network of claim 13, wherein the applied statistical measurements to the bit error rate distribution data include at least one of a fitted distribution curve envelope, a mean value, a median value, a mode value, a standard deviation value, a skewness value, a Pearson's coefficient value, an asymmetry characterization value, a Poisson deviation value, and a distribution data tail slope value.

17. The fiber optic communication network of claim 13, wherein the processing of the extracted statistical attribute data includes at least one of Artificial Neural Network (ANN) techniques, linear/nonlinear regression analysis techniques, support vector regression techniques, random forest techniques, nonlinear curve fitting techniques, and empirical formula estimation techniques.

18. The fiber optic communication network of claim 17, wherein the processing of the extracted statistical attribute data is executed by a multilayer perceptron (MLP) ANN technique that operates to model nonlinear relationships between the statistical attribute data and predict noise-to-signal ratios (NSRs) of the nonlinear noise components and linear noise components.

* * * * *

UNITED STATES PATENT AND TRADEMARK OFFICE
CERTIFICATE OF CORRECTION

PATENT NO. : 10,965,371 B2
APPLICATION NO. : 16/829744
DATED : March 30, 2021
INVENTOR(S) : Zhiping Jiang and Ali Salehiomran It is certified that error appears in the above-identified patent and that said Letters Patent is hereby corrected as shown below:

In the Claims

In Claim 3: "The optical coherent detection transceiver of claim" should be corrected to read -- The optical coherent detection transceiver of claim 1 --.

Signed and Sealed this
Tenth Day of August, 2021

Drew Hirshfeld
*Performing the Functions and Duties of the
Under Secretary of Commerce for Intellectual Property and
Director of the United States Patent and Trademark Office*